(12) United States Patent
Amento et al.

(10) Patent No.: US 10,367,898 B2
(45) Date of Patent: Jul. 30, 2019

(54) INTEREST PROFILES FOR AUDIO AND/OR VIDEO STREAMS

(71) Applicants: AT&T Intellectual Property I, L.P., Atlanta, GA (US); Brian Amento, Morris Plains, NJ (US); Christopher Harrison, Mount Kisco, NY (US); Larry Stead, Upper Montclair, NJ (US)

(72) Inventors: Brian Amento, Morris Plains, NJ (US); Christopher Harrison, Mount Kisco, NY (US); Larry Stead, Upper Montclair, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 81 days.

(21) Appl. No.: 13/751,722

(22) Filed: Jan. 28, 2013

(65) Prior Publication Data

US 2013/0138743 A1 May 30, 2013

Related U.S. Application Data (63) Continuation of application No. 13/326,909, filed on Dec. 15, 2011, now Pat. No. 8,392,238, which is a continuation of application No. 11/810,395, filed on Jun. 5, 2007, now Pat. No. 8,099,315.

(51) Int. Cl.
| | |
|---|---|
| *G06Q 30/00* | (2012.01) |
| *H04L 29/06* | (2006.01) |
| *H04L 29/08* | (2006.01) |
| *G06Q 30/02* | (2012.01) |
| *G06Q 30/06* | (2012.01) |

(52) U.S. Cl.
CPC ............ *H04L 67/22* (2013.01); *G06Q 30/02* (2013.01); *G06Q 30/0201* (2013.01); *G06Q 30/0202* (2013.01); *G06Q 30/0203* (2013.01); *G06Q 30/0204* (2013.01); *G06Q 30/0631* (2013.01)

(58) Field of Classification Search
CPC ............ H04L 1/00–69/00; G06Q 10/00–50/00
USPC ................................................ 705/7.11–7.42
See application file for complete search history.

(56) References Cited

U.S. PATENT DOCUMENTS

| | | | | |
|---|---|---|---|---|
| 4,870,579 A | * | 9/1989 | Hey | .................... G06Q 30/0202 |
| | | | | 705/7.31 |
| 4,996,642 A | * | 2/1991 | Hey | .................... G06Q 30/0201 |
| | | | | 705/7.29 |
| 5,223,924 A | | 6/1993 | Strubbe | |

(Continued)

OTHER PUBLICATIONS

"Non-Final Office Action for U.S. Appl. No. 11/810,395", United States Patent and Trademark Office (USPTO); dated Jul. 12, 2011; 17 pages.

(Continued)

*Primary Examiner* — Alan S Miller
(74) *Attorney, Agent, or Firm* — Toler Law Group, PC (57) ABSTRACT

A method includes determining, at a processor, a difference between a first user interest profile of a first user and a second user interest profile of a second user. The difference is associated with a portion of a first streaming media item. The method further includes transmitting, to a device associated with a third user interest profile of a third user, a first indication associated with the first streaming media item based on the difference. The first user, the second user, and the third user are distinct users.

20 Claims, 6 Drawing Sheets

(56) References Cited

U.S. PATENT DOCUMENTS

| | | | |
|---|---|---|---|
| 5,754,939 A * | 5/1998 | Herz et al. | 455/3.04 |
| 5,790,426 A * | 8/1998 | Robinson | 702/179 |
| 5,884,282 A * | 3/1999 | Robinson | 705/7.33 |
| 5,983,214 A * | 11/1999 | Lang et al. | |
| 6,029,195 A * | 2/2000 | Herz | 725/116 |
| 6,064,980 A * | 5/2000 | Jacobi et al. | 705/26.7 |
| 6,438,579 B1 * | 8/2002 | Hosken | 709/203 |
| 6,567,797 B1 | 5/2003 | Schuetze | |
| 6,782,550 B1 * | 8/2004 | Cao | 725/39 |
| 6,792,412 B1 | 9/2004 | Sullivan | |
| 6,912,521 B2 | 6/2005 | Kraft et al. | |
| 7,031,931 B1 | 4/2006 | Myers | |
| 7,051,352 B1 | 5/2006 | Schaffer | |
| 7,075,000 B2 * | 7/2006 | Gang et al. | 84/600 |
| 7,343,417 B2 * | 3/2008 | Baum | 709/228 |
| 7,403,910 B1 * | 7/2008 | Hastings et al. | 705/26.1 |
| 7,643,422 B1 * | 1/2010 | Covell et al. | 370/235 |
| 7,756,879 B2 * | 7/2010 | Parsons et al. | 707/748 |
| 7,827,055 B1 * | 11/2010 | Snodgrass et al. | 705/14.73 |
| 7,858,010 B2 | 12/2010 | Cho et al. | |
| 7,865,478 B2 * | 1/2011 | Badovinatz et al. | 707/689 |
| 7,899,700 B2 * | 3/2011 | Floyd et al. | 705/7.32 |
| 7,908,183 B2 * | 3/2011 | Jacobi et al. | 705/26.7 |
| 7,937,725 B1 * | 5/2011 | Schaffer et al. | 725/46 |
| 7,945,475 B2 * | 5/2011 | Jacobi et al. | 705/14.53 |
| 7,958,010 B2 * | 6/2011 | Huang | 705/26.7 |
| 7,970,922 B2 * | 6/2011 | Svendsen | 709/231 |
| 8,005,776 B2 | 8/2011 | Fithian et al. | |
| 8,099,315 B2 | 1/2012 | Amento | |
| 8,396,951 B2 * | 3/2013 | Svendsen et al. | 709/223 |
| 8,422,490 B2 * | 4/2013 | Svendsen et al. | 370/386 |
| 8,478,880 B2 * | 7/2013 | Finkelstein et al. | 709/227 |
| 8,490,123 B2 * | 7/2013 | Bodlaender et al. | 725/9 |
| 2002/0010759 A1 | 1/2002 | Hitson | |
| 2002/0059094 A1 | 5/2002 | Hosea | |
| 2002/0069218 A1 * | 6/2002 | Sull et al. | 707/501.1 |
| 2002/0097265 A1 | 7/2002 | Kurapati | |
| 2002/0111912 A1 * | 8/2002 | Hunter et al. | 705/52 |
| 2002/0162107 A1 | 10/2002 | Gutta | |
| 2002/0178057 A1 | 11/2002 | Bertram | |
| 2002/0193066 A1 | 12/2002 | Connelly | |
| 2002/0194586 A1 | 12/2002 | Gutta | |
| 2002/0199194 A1 | 12/2002 | Ali | |
| 2003/0014407 A1 * | 1/2003 | Blatter et al. | 707/6 |
| 2003/0066068 A1 | 4/2003 | Gutta | |
| 2003/0088480 A1 * | 5/2003 | Berghofer et al. | 705/26 |
| 2003/0093790 A1 * | 5/2003 | Logan et al. | 725/38 |
| 2003/0105870 A1 * | 6/2003 | Baum | 709/228 |
| 2003/0191826 A1 * | 10/2003 | Bellinger et al. | 709/220 |
| 2003/0234805 A1 | 12/2003 | Toyama | |
| 2004/0003392 A1 | 1/2004 | Trajkovic | |
| 2004/0032486 A1 * | 2/2004 | Shusman | 348/14.09 |
| 2004/0064526 A1 | 4/2004 | Lee | |
| 2004/0210491 A1 * | 10/2004 | Sadri | 705/26 |
| 2005/0022239 A1 * | 1/2005 | Meuleman | 725/46 |
| 2005/0096997 A1 * | 5/2005 | Jain et al. | 705/26 |
| 2005/0131918 A1 | 6/2005 | Hillis | |
| 2005/0144632 A1 | 6/2005 | Mears | |
| 2005/0149974 A1 | 7/2005 | Norman | |
| 2006/0020614 A1 | 1/2006 | Kolawa | |
| 2006/0041548 A1 * | 2/2006 | Parsons | G06F 16/954 |
| 2006/0150216 A1 * | 7/2006 | Herz et al. | 725/50 |
| 2006/0195790 A1 * | 8/2006 | Beaupre | G06F 21/10 715/727 |
| 2006/0259355 A1 | 11/2006 | Farouki | |
| 2006/0288041 A1 | 12/2006 | Plastina | |
| 2007/0011039 A1 | 1/2007 | Oddo | |
| 2007/0078876 A1 * | 4/2007 | Hayashi et al. | 707/101 |
| 2007/0136753 A1 * | 6/2007 | Bovenschulte | H04H 60/31 725/46 |
| 2007/0157221 A1 * | 7/2007 | Ou et al. | 725/10 |
| 2008/0082394 A1 | 4/2008 | Floyd et al. | |
| 2008/0126109 A1 * | 5/2008 | Cragun et al. | 705/1 |
| 2008/0319833 A1 * | 12/2008 | Svendsen | 705/10 |
| 2009/0077052 A1 * | 3/2009 | Farrelly | 707/5 |
| 2011/0173194 A1 | 7/2011 | Sloo et al. | |
| 2012/0089437 A1 | 4/2012 | Amento | |

OTHER PUBLICATIONS

"Non-Final Office Action for U.S. Appl. No. 13/326,909", United States Patent and Trademark Office (USPTO), dated Apr. 25, 2012, 21 pages.

"Notice of Allowance and Fee(s) Due for U.S. Appl. No. 11/810,395", United States Patent and Trademark Office (USPTO), dated Nov. 7, 2011, 12 pages.

"Notice of Allowance and Fee(s) Due for U.S. Appl. No. 13/326,909; dated Oct. 26, 2012; 14 pages", United States Patent and Trademark Office (USPTO).

Balabanovic, Marko; "Fab: Content-Based, Collaborative Recommendation" Communications of the ACM, Mar. 1997/vol. 40, No. 3.

Basu, Chumki; "Recommendation as Classification: Using Social and Content-Based Information; AAAI-98 Proceedings.", Copyright © 1998, AAAI.

Hefeeda, Mohamed; "Promise: Peer-to-Peer Media Streaming Using CollectCast" MM'03, Nov. 2-8, 2003, Berkeley, California, USA. Copyright 2003 ACM 1-58113-722-2/03/0011.

Krishnakumar, Anita; "Recoo: A Recommendation System for Youtube RSS feeds", University of California, Santa Cruz, 2007.

Pazzani, Michael J; "A Framework for Collaborative, Content-Based and Demographic Filtering"; Artificial Intelligence Review 13, © 2000 Kluwer Academic Publishers. Printed in the Netherlands, 1999, pp. 393-408.

Shardanand, Upendra, "Social Information Filtering: Algorithms for Automating "Word of Mouth"; CHI' 95," Denver, Colorado, USA ©1995 ACM 0-89791-694-8/95/0005.

* cited by examiner

INTEREST PROFILES FOR AUDIO AND/OR VIDEO STREAMS

PRIORITY CLAIM

This application is a continuation of, and claims priority to, U.S. patent application Ser. No. 13/326,909, filed on Dec. 15, 2011, and entitled "INTEREST PROFILES FOR AUDIO AND/OR VIDEO STREAMS," which is a continuation of U.S. patent application Ser. No. 11/810,395 filed on Jun. 5, 2007, now issued as U.S. Pat. No. 8,099,315, and entitled "INTEREST PROFILES FOR AUDIO AND/OR VIDEO STREAMS," each of which is incorporated herein by reference in its entirety.

FIELD OF THE DISCLOSURE

The present disclosure is generally related to methods and systems for determining user interest in audio and/or video streams.

BACKGROUND

A large quantity of streaming media items, such as audio items and video items, are available to users through cable television, Internet Protocol television (IPTV), internet radio and other distribution systems. Recommendation systems have been proposed to help users find and play those items that may be of interest to them, and to filter out items that may not be of interest to them. For television programming, some recommendation systems cluster people based on what shows they enjoy. However, different people may enjoy the same show for different reasons. For example, a first group of people may like a television show such as "Law & Order" because of its being an investigative drama, and a second group of people may like the same television show because of its being a court drama. Using a current voting system for television programming, both the first group and the second group would indicate that they enjoy this television show. However, current recommendation systems may use this information to make an ill-advised recommendation of other court dramas to the first group, and/or other investigative dramas to the second group.

BRIEF DESCRIPTION OF THE DRAWINGS

FIGS. 5(A-D) show examples of three aggregate user interest profiles of three groups of users toward the same program, and a user interest profile of the user toward the same program;

FIGS. 7(A-C) show examples of two interest profiles for the same streaming media item, and an example of an interest difference profile formed by calculating a difference between the two interest profiles;

FIGS. 9(A-D) show examples of aggregate interest profiles of a group toward three programs, and an example of a combined streaming media item that combines the high-interest portions into a continuous high-interest program.

DETAILED DESCRIPTION

Disclosed herein are embodiments of methods and systems that provide a profile of portion-varying and/or time-varying ratings throughout an entire stream of content. The in-stream ratings can be used during playback to concentrate on the best portions of the stream or to segment the stream and to keep only those segments having high quality ratings. Storage space can be saved by storing higher-quality segments and not storing lower-quality segments. More powerful recommendation systems can be created using the profile in contrast to using an overall enjoyment rating for each streaming media item.

Figure 1:
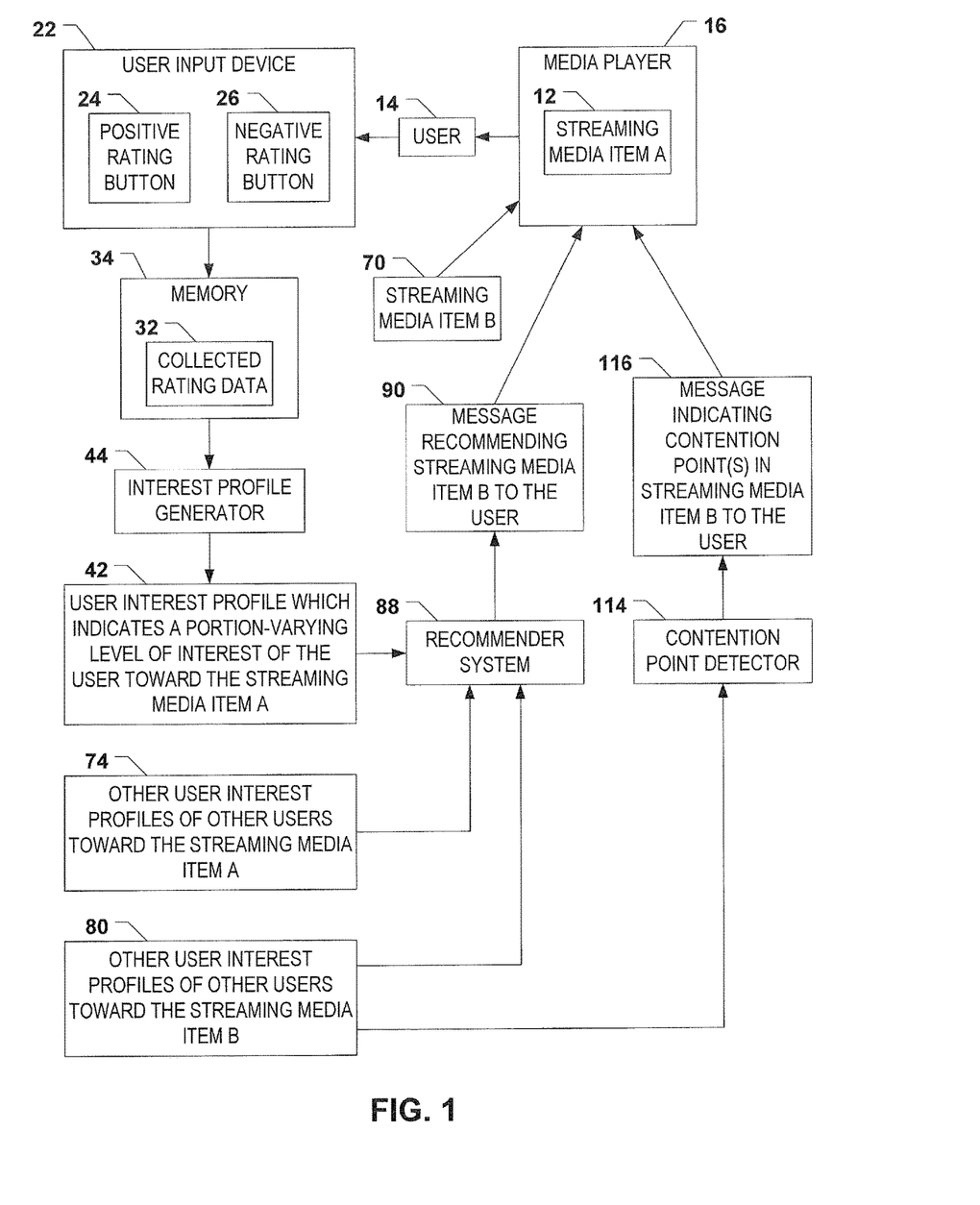
FIG. 1 is a block diagram of an embodiment of a system for determining and using a user interest profile.
Figure 2:
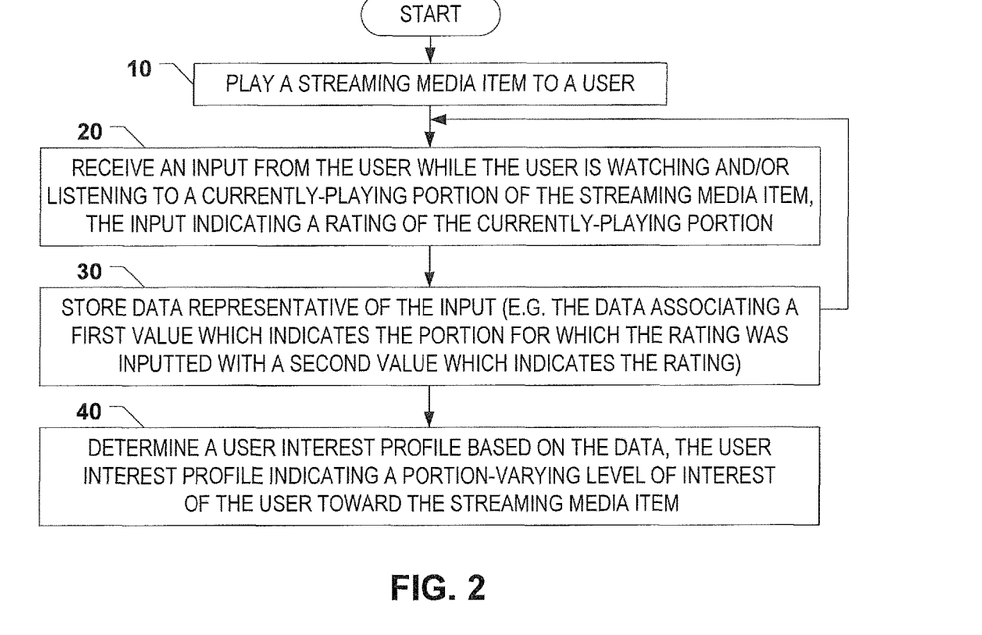
FIG. 2 is a flow chart of an embodiment of a method of determining a user interest profile.

FIG. 1 is a block diagram of an embodiment of a system for determining and using the user interest profile, and FIG. 2 is a flow chart of an embodiment of a method of determining a user interest profile. As indicated by block 10, the method comprises playing a streaming media item A 12 to a user 14. Examples of any of the herein-disclosed streaming media items, including the streaming media item A 12, include but are not limited to video items such as movies, documentaries and television programs, and audio items such as songs and radio programs. The video items and audio items may be recorded or live. A media player 16 may be used to play the streaming media item A 12 to the user 14. Examples of the media player 16 include but are not limited to a computer, a wireless telephone, a digital audio player, a set-top box, a television, a radio, or an alternative device operable to play audio and/or video received as packets. The streaming media item A 12 may be either fully-downloaded, progressively-downloaded, or otherwise streamed to the site of the user 14 while the media player 16 plays the streaming media item A 12. In an embodiment, an IPTV service provider provides the streaming media item A 12 to the user 14.

As indicated by block 20, the method comprises receiving an input from the user 14 while the user is watching and/or listening to a currently-playing portion of the streaming media item A 12. The input indicates a rating, by the user 14, of the currently-playing portion of the streaming media item A 12. The input may be received by a user input device 22. In an embodiment, the user input device 22 comprises a positive rating button 24 and a negative rating button 26. The user 14 indicates a positive rating of the currently-playing portion of the streaming media item A 12 by pushing or otherwise selecting the positive rating button 24. The user 14 indicates a negative rating of the currently-playing portion of the streaming media item A 12 by pushing or otherwise selecting the negative rating button 26. Different levels of positive and negative ratings can be indicated by repeated selections of the positive rating button 24 and the negative rating button 26, respectively. The positive rating button 24 and negative rating button 26 may be metaphors for more complex adjective pairs such as exciting/slow, interesting/boring, well-done/cheesy, and unexpected/predictable. To mitigate any bias of the user 14, no additional meaning beyond positive/negative is supplied to the user 14.

As indicated by block 30, the method comprises storing data 32 representative of the input from the user 14. The data 32 may associate a first value, which indicates the particular portion of the streaming media item A 12 for which the rating was inputted, with a second value which indicates the rating (e.g. positive or negative) inputted by the user 14. The first value may indicate the particular portion by a time value. For example, the first value may indicate that the rating was inputted at a time position of 2 minutes, 52 seconds from the beginning of the streaming media item A 12. Alternatively, the first value may indicate the particular position by a frame value. For example, the first value may indicate that the rating was inputted while the Nth frame of the streaming media item A 12 was being displayed.

The acts indicated by blocks 20 and 30 are repeated one or more times as the user 14 watches and/or listens to the streaming media item A 12. As the acts are repeated, the data 32 is collected in the memory 34 over a course (which may be entire course) of the streaming media item A 12. The collected data 32 indicates a plurality of ratings inputted by the user 14 for a plurality of respective portions of the streaming media item A 12. Each of the plurality of ratings is inputted by the user during playback of its respective portion of the streaming media item A 12. The user 14 decides how many and/or which respective portions of the streaming media item A 12 to express the ratings. The collection of data 32 can be viewed as representing individual votes regarding the quality of the streaming media item A 12, the votes being temporally synchronized to a stream of the streaming media item A 12. The data 32 can be stored either at a premise of the user 14, or at a site of a media service provider (e.g. an IPTV service provider), or at a site of a third-party advertiser.

As indicated by block 40, the method comprises determining a user interest profile 42 based on the data 32. The user interest profile 42 indicates a portion-varying level of user interest of the user 14 toward the streaming media item A 12. The user interest profile 42 may span the entire course of the streaming media item A 12. The user interest profile 42 may be determined by an interest profile generator 44. The interest profile generator 44 can be located either at a premise of the user 14, or at a site of a media service provider (e.g. an IPTV service provider), or at a site of a third-party advertiser.

Many different approaches can be used to create the user interest profile 42 based on the data 32. In an embodiment, when the streaming media item A 12 first begins, the user interest profile 42 indicates an interest level of the user 14 that is neither positive nor negative (e.g. a nominal or average level). The interest level is increased for a section of the streaming media item A 12 for which the positive rating button 24 was pressed or otherwise selected. The interest level is decreased for a section of the streaming media item A 12 for which the negative rating button 26 was pressed or otherwise selected. Repeated button presses in one direction will accumulate to further increase or decrease the interest level in the user interest profile 42.

The user 14 may be likely to indicate his/her interest level at noteworthy points in the streaming media item A 12, but thereafter may be unlikely to adjust his/her interest level back to an average state. To handle this scenario, the user interest profile 42 is generated to have an interest level that responds to the user-inputted ratings as described above, but returns toward the nominal level over periods of inactivity (e.g. periods for which no user-inputted ratings are received). The return toward the nominal level can be a linear decay, an exponential decay, or according to another decay function.

In an embodiment, the user interest profile 42 is generated using curve fitting and/or interpolation to fit a smooth and/or continuous curve over the data 32.

The method of collecting user interest data tied to particular portions of a media stream gives finer-grained ratings data compared with existing recommender systems. This user interest data can be used for applications such as social recommendation applications, contention point applications, and social highlighting applications. Embodiments of social recommendation applications are subsequently described with reference to FIGS. 4 and 5. Embodiments of contention point applications are subsequently described with reference to FIGS. 6 and 7. Embodiments of social highlighting applications are subsequently described with reference to FIGS. 8 and 9. The user interest data may be used internally by a media service provider, such as an IPTV service provider, to provide these and other applications. Alternatively, some applications may be provided by a third-party advertiser. The third-party advertiser may receive user interest data and/or interest profiles either from a plurality of users including the user 14, or from the media service provider (e.g. the IPTV service provider) that serves the plurality of users including the user 14. The third-party advertiser may target an advertisement (e.g. recommend a media content item) to the user 14 based on the received data and/or received interest profiles.

Figure 3:
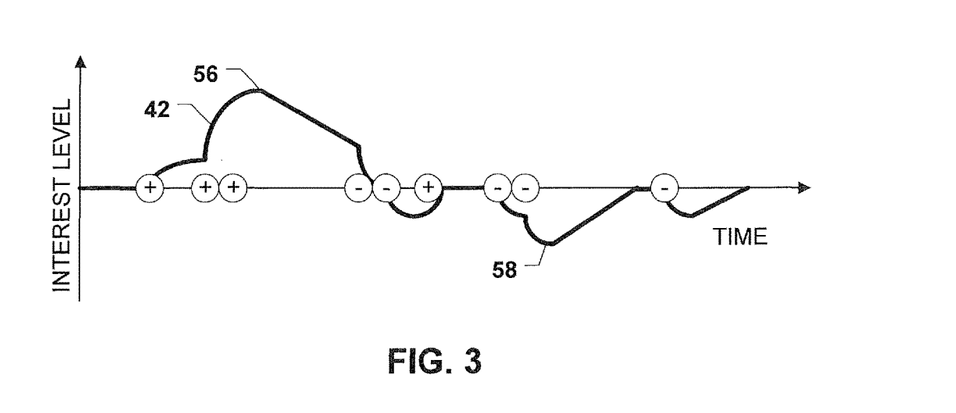
FIG. 3 is an example of a user interest profile.

FIG. 3 is an example of the user interest profile 42. The user interest profile 42 indicates an interest level versus time over the course of the streaming media item A 12. The user interest profile 42 is generated based on positive indications (indicated by the circles containing a plus sign) and negative indications (indicated by circles containing a minus sign) inputted by the user 14. The times associated with the positive indications and the negative indications are indicated by the time axis. The resulting user interest profile 42 may indicate a high interest portion 56 and a low interest portion 58 of the streaming media item A 12.

Figure 4:
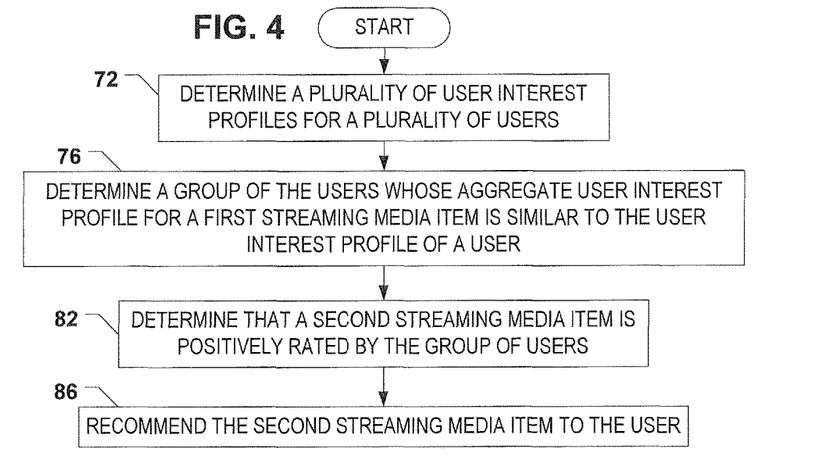
FIG. 4 is a flow chart of an embodiment of a method of recommending a streaming media item to a user based on a user interest profile.
Figure 5A:
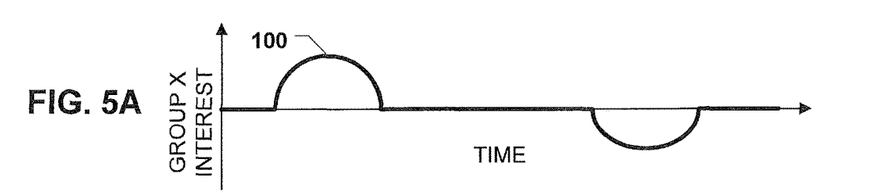
Figure 5B:
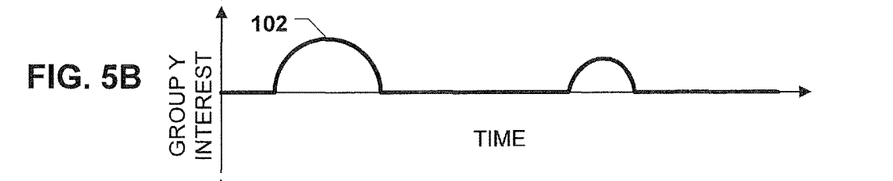
Figure 5C:
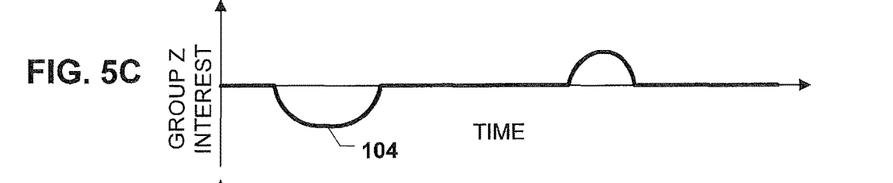
Figure 5D:
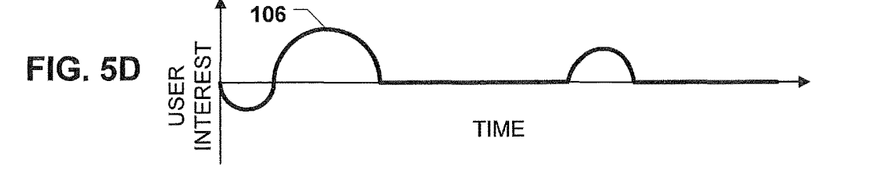

FIG. 4 is a flow chart of an embodiment of a method of recommending a streaming media item B 70 to the user 14 based on the user interest profile 42. As indicated by block 72, the method comprises determining a plurality of user interest profiles 74 for a plurality of users. Each of the user interest profiles 74 indicates a respective portion-varying level of interest of a respective one of the users toward the streaming media item A 12.

As indicated by block 76, the method comprises determining a group of the users whose aggregate user interest profile for the streaming media item A 12 is similar to the user interest profile 42. The aggregate user interest profile is a user interest profile formed by aggregating the interest data collected for all of the users in the group. In an embodiment, an aggregation of collected rating data for a number of users is processed by the interest profile generator 44 (e.g. as if for a single user) but divided by the number of users to form the aggregate user interest profile. In another embodiment, the aggregate user interest profile is generated by processing a number of user interest profile curves.

As indicated by block 82, the method comprises determining that streaming media item B 70 is positively rated by the group of users whose aggregate user interest profile is similar to the user interest profile 42. The aggregate user interest profile may be deemed to be similar to the user interest profile 42 based on a high degree of correlation between their two respective functions of time. The streaming media item B 70 may be determined to be positively rated based on other user interest profiles 80 of other users toward the streaming media item B 70.

As indicated by block 86, the method comprises recommending the streaming media item B 70 to the user 14 based on said determining in block 82. This act can be performed by a recommender system 88, which sends a recommendation message 90 for the streaming media item B 70 to the user 14. The recommender system 88 can be located either at a premise of the user 14, or at a site of a media service provider (e.g. an IPTV service provider), or at a site of a third-party advertiser. Thus, the act of recommending may be performed by the IPTV service provider, or the advertiser who is advertising the streaming media item B 70, or another entity.

In an embodiment, the recommendation message 90 is sent to the user 14 via an Internet Protocol (IP) network such as an IPTV network provided by an IPTV service. Based on the recommendation message 90, a recommendation of the streaming media item B 70 is displayed by a visual display device and/or an audio output device. In an embodiment, the recommendation message 90 comprises an advertisement for the streaming media item B 70. In response to the recommendation message 90, the user 14 may order or otherwise select the streaming media item B 70, and thereafter play the streaming media item B 70 using the media player 16. An IPTV service provider may provide the streaming media item B 70 to the user 14.

FIGS. 5(A-C) show examples of three aggregate user interest profiles 100, 102 and 104 of three groups X, Y and Z of users toward the same program (or alternative streaming media item). As a user watches the program for the first time, interest data is collected. When the program is complete, an analysis can be performed to see if a group of users had similar characteristics. FIG. 5D shows a user interest profile 106 of the user 14 toward the same program. The user interest profile 106 is compared to the three aggregate user interest profiles 100, 102 and 104 to determine a best fit. In this example, the user interest profile 106 is most similar to the aggregate user interest profile 102 for group Y. The recommender system searches for another program that is highly rated by the users in group Y, and recommends the other program to the user 14.

The aforementioned approach can be applied either to a single program or to multiple programs. If a group has similar interest profiles for many programs, it is likely that they enjoy similar shows for similar reasons.

Figure 6:
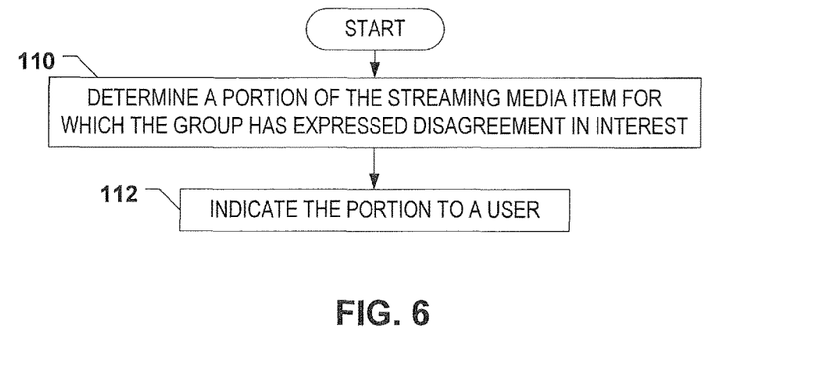
FIG. 6 is a flow chart of an embodiment of a method of determining a contention point in a streaming media item.

FIG. 6 is a flow chart of an embodiment of a method of determining a contention point in a streaming media item. A contention point is a portion of the streaming media item at which a significant level of disagreement is exhibited in the interest level of different users. In an embodiment, the different users are within the same group. The users can be automatically placed in the group based on collected interest data, or can choose to join the group. Examples of groups that users join include a group of friends, a group of family members and a group of co-workers.

As indicated by block 110, the method comprises determining a portion of the streaming media item for which the group has expressed disagreement in interest. This act may comprise determining an interest difference profile based on a difference between two interest profiles for the streaming media item. In an embodiment, the interest different profile is determined by subtracting a first interest profile from a second interest profile for the streaming media item. This act may further comprise determining that the interest difference profile is beyond a predetermined agreement threshold for a portion of the streaming media item. If a difference level for a section of the streaming media item is above a predetermined agreement threshold, that section of streaming media item is considered a contention point at which disagreement in interest has been expressed.

As indicated by block 112, the method comprises indicating the portion to a user. The portion may be indicated to the user either while he/she is watching/listening to the streaming media item, or after he/she has watched/listened to the streaming media item, or before he/she has watched/listened to the streaming media item. For example, the portion can be indicated to the user 14 via the media player 16. Indicating the contention point to users promotes a collaborative and interactive viewing experience for television and other stream-based media. For example, the indication of the contention point may promote discussion of the streaming media item to be generated within the group.

The contention point may be determined by a contention point detector 114. The contention point detector 114 may generate a message 116 to indicate the contention point to the user 14.

For example, the contention point detector 114 may detect one or more contention points in streaming media item B 70 based on the other user interest profiles 80. The message 116 may indicate, to the user 14, the one or more contention points in the streaming media item B 70. The message 116 may be communicated to the media player 16 either before, during, or after the streaming media item B 70 has been communicated to the media player 16.

Figure 7A:
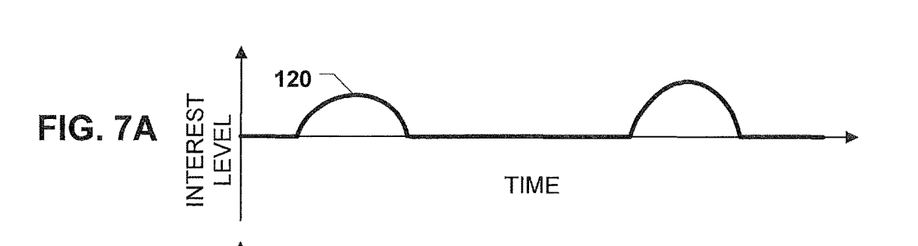
Figure 7B:
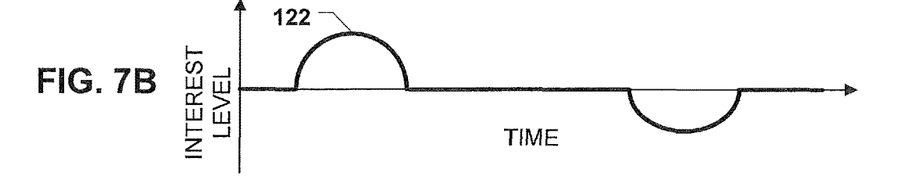
Figure 7C:
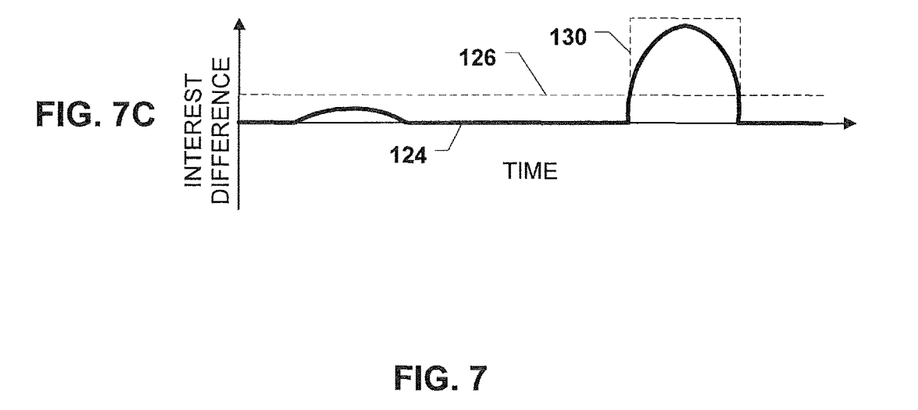

FIGS. 7(A-B) show examples of two interest profiles 120 and 122 for the same streaming media item. FIG. 7C shows an example of an interest difference profile 124 formed by calculating a difference between the interest profiles 120 and 122. An agreement threshold 126 is used to determine if any contention points exist in the interest difference profile 124. In this example, a portion 130 of the streaming media item has an associated interest difference that exceeds the agreement threshold 126, and is thus considered to be a contention point.

Figure 8:
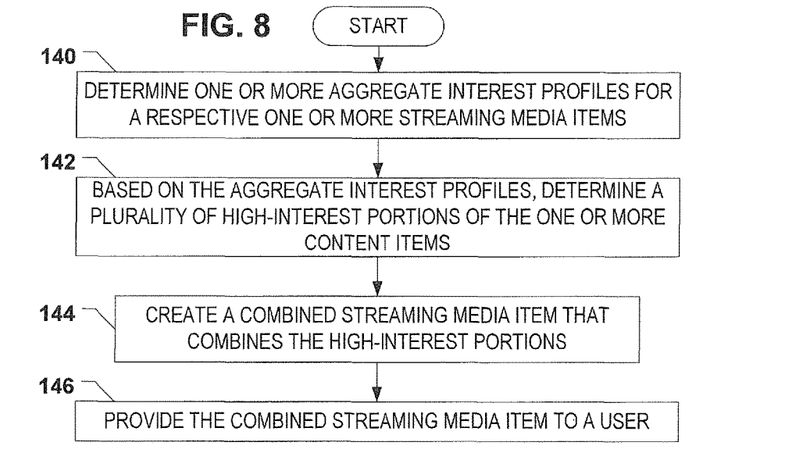
FIG. 8 is a flow chart of an embodiment of a method of creating a streaming media item based on a plurality of interest profiles.
Figure 9A:
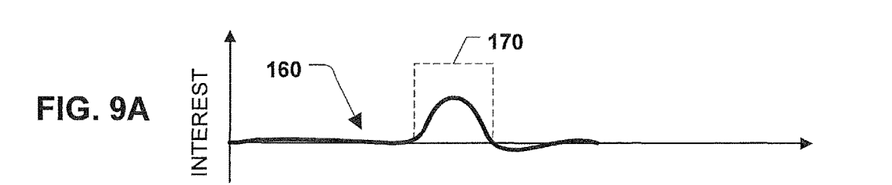
Figure 9B:
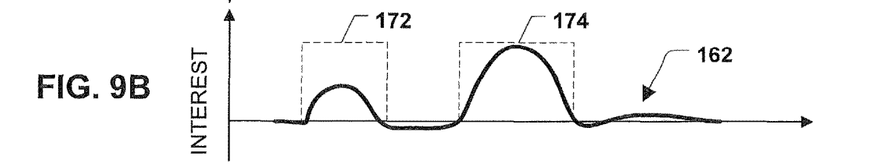
Figure 9C:
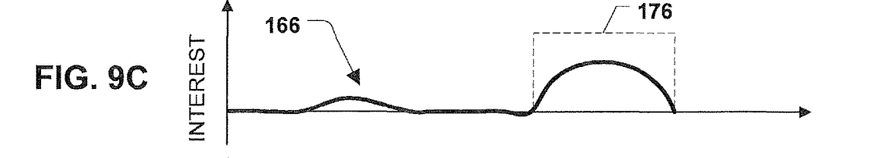
Figure 9D:
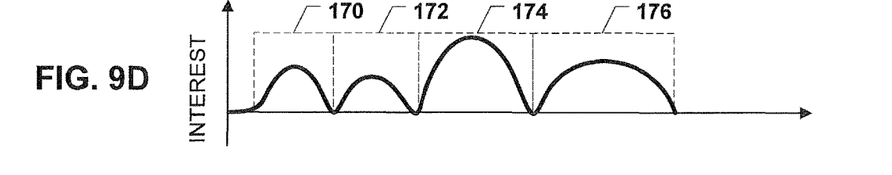

FIG. 8 is a flow chart of an embodiment of a method of creating a streaming media item based on a plurality of interest profiles.

As indicated by block 140, the method comprises determining one or more aggregate interest profiles for a respective one or more streaming media items. Each of the aggregate interest profiles indicates a portion-varying level of interest of members of a group toward its respective streaming media item. Each of the group interest profiles is based on a plurality of ratings inputted by the group members for a plurality of respective portions of its respective streaming media item.

As indicated by block 142, the method comprises determining a plurality of high-interest portions of the one or more streaming media items based on the aggregate interest profiles. A portion is deemed to be of high-interest if either a spike or a sustained plateau of high aggregate interest (e.g. aggregate interest above a threshold) is identified therefore. This may occur, for example, when an exciting play occurs during a sporting event or when a particularly interesting or relevant story airs on a news program.

As indicated by block 144, the method comprises extracting the high-interest portions from the one or more streaming media items and creating a combined streaming media item that combines the high-interest portions. The combined streaming media item is a synthesized high-interest program comprising a succession of the extracted high-interest portions.

As indicated by block 146, the method comprises providing the combined streaming media item to a user. The combined streaming media item can be provided to the user because the user has manually selected the group, or because the system has automatically determined that the user has like interests with people in the group.

In an embodiment, the one or more streaming media items are limited by at least one criterion selected or otherwise inputted by the user. For example, one or more streaming media items may be limited to a plurality of streaming media items in a particular genre (e.g. all sporting events) selected by the user, and/or a plurality of streaming media items in a particular time period (e.g. everything within the last hour or the current day) selected by the user. Alternatively, the one or more streaming media items may be limited to a single program (e.g. a single football game) selected by the user. As another alternative, the one or more streaming media items may comprise all available programming.

This method empowers users to act collectively to filter streaming media and to remix streams by their ratings.

FIGS. 9(A-C) show examples of aggregate interest profiles 160, 162 and 166 of a group toward three programs. The three programs can originate from one or more sources. The aggregate interest profile 160 exhibits a high-interest portion 170. The aggregate interest profile 162 exhibits two high-interest portions 172 and 174. The aggregate interest profile 166 exhibits a high-interest portion 176. FIG. 9D shows an example of a combined streaming media item that combines the high-interest portions 170, 172, 174 and 176 into a continuous high-interest program.

The herein-disclosed streaming media items can be stored in a variety of ways. For example, any of the herein-disclosed streaming media items can be either stored locally to the user 14 (e.g. on a digital video recorder of the user 14), stored on a central server in a network that serves media content to the user 14, or distributed through a peer-to-peer network that serves media content to the user 14. Various distribution mechanisms can be used to distribute streaming media items in packets to users.

Figure 10:
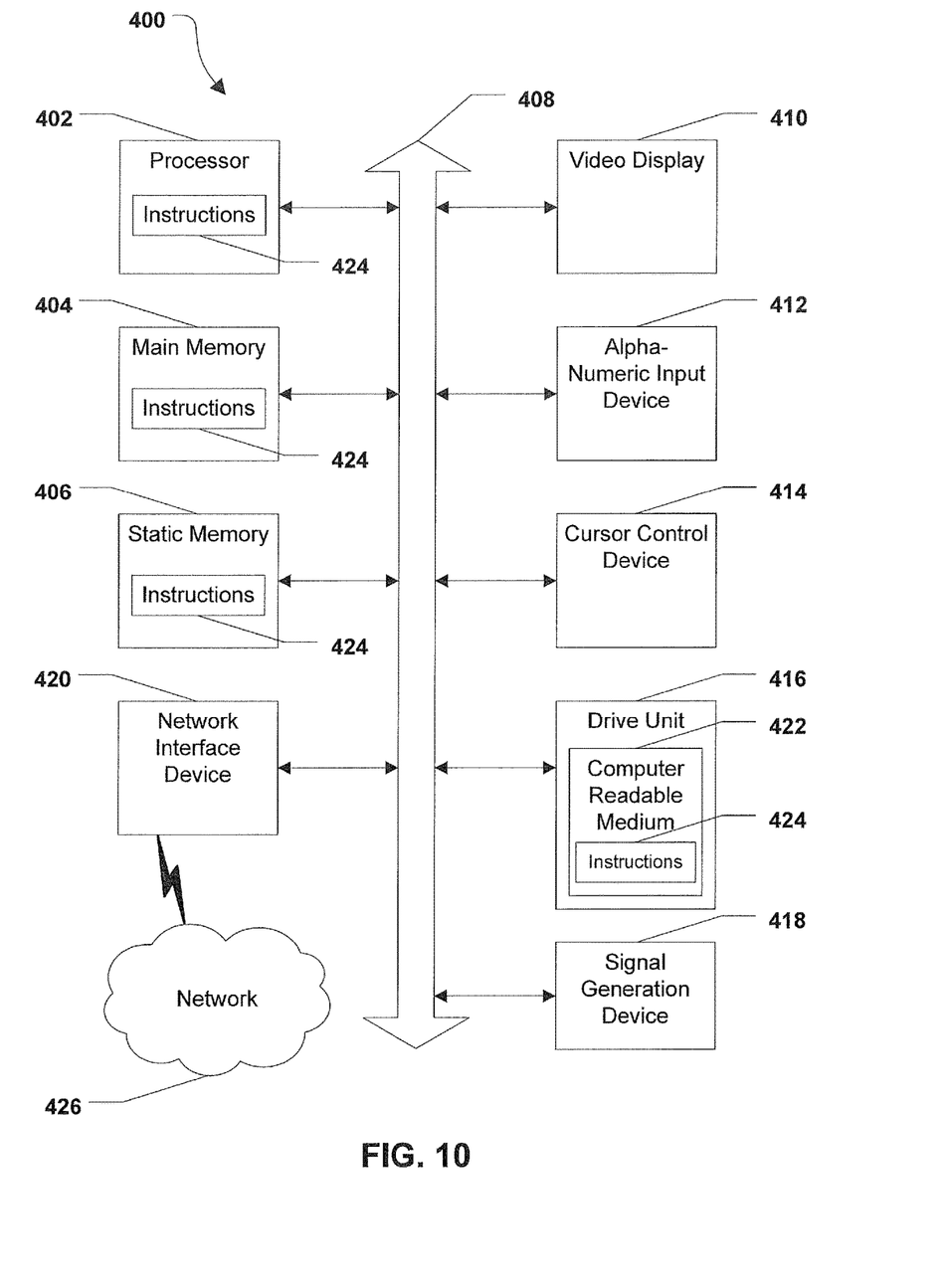
FIG. 10 is a block diagram of an illustrative embodiment of a computer system.

Referring to FIG. 10, an illustrative embodiment of a computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 10, the computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 10, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term in "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
   in response to an aggregate interest profile associated with a first streaming media item indicating that the first streaming media item is high quality, saving the first streaming media item to a memory, wherein the aggregate interest profile aggregates a first interest profile for the first streaming media item provided by a second user and a second interest profile for the first streaming media item provided by a third user;
   in response to a second aggregate interest profile associated with a second streaming media item indicating that the second streaming media item is not high quality, not saving the second streaming media item to the memory;
   sending, from a processor, a recommendation for the first streaming media item to a device associated with a first user;
   determining, at the processor, a difference between the first interest profile and the second interest profile, the difference associated with a portion of the first streaming media item;
   comparing, at the processor, the difference to a threshold value; and
   in response to the difference exceeding the threshold value and after sending the recommendation, transmitting, from the processor, a first indication associated with the first streaming media item based on the difference to the device, wherein the first user, the second user, and the third user are distinct users.

2. The method of claim 1, wherein the difference indicates that the portion comprises a contention point associated with the first streaming media item and associated with a group of users that includes the first user, the second user, and the third user.

3. The method of claim 1, further comprising identifying a third interest profile for a second streaming media item provided by the third user, the third interest profile indicating a first level of user interest associated with the second streaming media item.

4. The method of claim 1, wherein the second user and the third user are associated with a group, wherein the group associates a positive rating with the first streaming media item, wherein the group is associated with an aggregate interest profile for a second streaming media item, wherein the aggregate interest profile for the second streaming media item is similar to a third interest profile for the second streaming media item provided by the first user, and wherein the recommendation of the first streaming media item is sent to the device based on the positive rating by the group and based on the aggregate interest profile for the second streaming media item being similar to the third interest profile for the second streaming media item.

5. The method of claim 1, wherein the device displays information based on the first indication, wherein the information identifies the portion as a point of contention, and wherein the device displays the information before presenting the first streaming media item or after presenting the first streaming media item.

6. The method of claim 1, further comprising transmitting an advertisement for the first streaming media item to the device.

7. The method of claim 1, wherein the processor is associated with a television service provider.

8. The method of claim 1, wherein the processor is associated with a third-party advertiser.

9. The method of claim 1, wherein the device displays information based on the first indication, and wherein the information identifies the portion as a contention point during presentation of the first streaming media item.

10. The method of claim 1, wherein:
the first interest profile indicates a first interest level of the second user in a plurality of portions of the first streaming media item;
the second interest profile indicates a second interest level of the third user in the plurality of portions of the first streaming media item; and
wherein determining the difference associated with the portion of the first streaming media item comprises comparing the first interest level in the portion with the second interest level in the portion.

11. A system comprising:
a processor; and
a memory accessible to the processor, the memory including instructions that, when executed by the processor, cause the processor to perform operations including:
in response to an aggregate interest profile associated with a first streaming media item indicating that the first streaming media item is high quality, saving the first streaming media item to a memory, wherein the aggregate interest profile aggregates a first interest profile for the first streaming media item provided by a second user and a second interest profile for the first streaming media item provided by a third user;
in response to a second aggregate interest profile associated with a second streaming media item indicating that the second streaming media item is not high quality, not saving the second streaming media item to the memory;
sending a recommendation for the first streaming media item to a device associated with a first user;
determining a difference between the first interest profile and the second interest profile, the difference associated with a portion of the first streaming media item;
comparing the difference to a threshold value; and
in response to the difference exceeding the threshold value and after sending the recommendation, transmitting a first indication associated with the first streaming media item based on the difference to the device, wherein the first user, the second user, and the third user are distinct users.

12. The system of claim 11, wherein the operations further comprise transmitting, to the device, a second indication that identifies a second streaming media item, the second streaming media item comprising a succession of high-interest portions selected from a set of streaming media items based on group interest levels.

13. The system of claim 11, wherein the second user and the third user are associated with a group, and wherein a particular aggregate user interest profile associated with the group comprises a plurality of group interest levels, each group interest level of the plurality of the group interest levels associated with a corresponding portion of a particular streaming media item.

14. The system of claim 11, wherein the operations further comprise:
identifying high-interest portions of a set of streaming media items by selecting a plurality of particular portions of the set of streaming media items based on a corresponding aggregate user interest profile for each streaming media item of the set of streaming media items; and
transmitting a second indication to the device, the second indication identifying a succession of the high-interest portions.

15. The system of claim 14, wherein the operations further comprise transmitting the second indication based on determining that a group interest level of an aggregate user interest profile corresponding to each particular portion of the plurality of particular portions is greater than a second threshold value.

16. The system of claim 11, wherein:
the first interest profile indicates a first interest level of the second user in a plurality of portions of the first streaming media item;
the second interest profile indicates a second interest level of the third user in the plurality of portions of the first streaming media item; and
wherein determining the difference associated with the portion of the first streaming media item comprises comparing the first interest level in the portion with the second interest level in the portion.

17. A computer-readable hardware device storing instructions, the instructions executable by a processor to cause the processor to perform operations including:
in response to an aggregate interest profile associated with a first streaming media item indicating that the first streaming media item is high quality, saving the first streaming media item to a memory, wherein the aggregate interest profile aggregates a first interest profile for the first streaming media item provided by a second user and a second interest profile for the first streaming media item provided by a third user;
in response to a second aggregate interest profile associated with a second streaming media item indicating that the second streaming media item is not high quality, not saving the second streaming media item to the memory;
sending a recommendation for the first streaming media item to a device associated with a first user;
determining a difference between the first interest profile and the second interest profile, the difference associated with a portion of the first streaming media item;
comparing the difference to a threshold value; and
in response to the difference exceeding the threshold value and after sending the recommendation, transmitting a first indication associated with the first streaming media item based on the difference to the device, wherein the first user, the second user, and the third user are distinct users.

18. The computer-readable hardware device of claim 17, wherein the operations further include determining whether the first streaming media item is positively rated by a group based on an aggregate interest profile for the first streaming media item associated with the group, and wherein the first user and the second user are associated with the group.

19. The computer-readable hardware device of claim 17, wherein the operations further include:
   subtracting a first interest value of the first interest profile associated with the portion from a second interest value of the second interest profile associated with the portion to generate a result; and
   determining whether the result is greater than the threshold value, wherein the first indication is transmitted in response to a determination that the result is greater than the threshold value.

20. The computer-readable hardware device of claim 17, wherein:
   the first interest profile indicates a first interest level of the second user in a plurality of portions of the first streaming media item;
   the second interest profile indicates a second interest level of the third user in the plurality of portions of the first streaming media item; and
   wherein determining the difference associated with the portion of the first streaming media item comprises comparing the first interest level in the portion with the second interest level in the portion.

\* \* \* \* \*